United States Patent
Tsirkin

(10) Patent No.: US 10,616,099 B2
(45) Date of Patent: Apr. 7, 2020

(54) HYPERVISOR SUPPORT FOR NETWORK FUNCTIONS VIRTUALIZATION

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 58 days.

(21) Appl. No.: 15/688,794

(22) Filed: Aug. 28, 2017

(65) Prior Publication Data

US 2019/0068491 A1    Feb. 28, 2019

(51) Int. Cl.
| | |
|---|---|
| *H04L 12/721* | (2013.01) |
| *H04L 12/713* | (2013.01) |
| *G06F 9/455* | (2018.01) |
| *H04L 12/24* | (2006.01) |
| *H04L 29/08* | (2006.01) |

(52) U.S. Cl.
CPC .......... *H04L 45/38* (2013.01); *G06F 9/45558* (2013.01); *H04L 41/082* (2013.01); *H04L 41/50* (2013.01); *H04L 45/586* (2013.01); *G06F 2009/45595* (2013.01); *H04L 29/08* (2013.01)

(58) Field of Classification Search
CPC ....... H04L 45/38; H04L 41/082; H04L 41/50; H04L 45/586; H04L 29/08; G06F 9/45558; G06F 2009/45595
See application file for complete search history.

(56) References Cited

U.S. PATENT DOCUMENTS

| | | | |
|---|---|---|---|
| 7,496,961 B2 | 2/2009 | Zimmer et al. | |
| 7,640,591 B1 | 12/2009 | Tripathi et al. | |
| 8,250,641 B2 | 8/2012 | Morgan et al. | |
| 8,938,611 B1 | 1/2015 | Zhu et al. | |
| 9,166,988 B1 | 10/2015 | Shin et al. | |
| 9,276,875 B2 | 3/2016 | Dong et al. | |
| 9,419,897 B2 | 8/2016 | Cherian et al. | |
| 9,557,992 B2 | 1/2017 | Tashiro et al. | |

(Continued)

FOREIGN PATENT DOCUMENTS

CN    103023912 A    4/2013

OTHER PUBLICATIONS

Unknown. "Network Functions Virtualization". http://www.rulepaper.com/COURSE%20SET%201/pdf/Network_Functions_Virtualization.PDF. Retrieved on Aug. 22, 2017. 4 pages.

(Continued)

*Primary Examiner* — Melvin C Marcelo
(74) *Attorney, Agent, or Firm* — Lowenstein Sandler LLP

(57) ABSTRACT

A method may include receiving, at a hypervisor executing on a host machine, a packet processing module from a virtual machine running on the hypervisor, receiving, at the hypervisor, a packet sent by a source node to a destination node separate from the virtual machine, the packet intended to be routed via the virtual machine running on the hypervisor to reach the destination node. The method may also include causing the packet processing module to process the packet for transmission to the destination node in view of a first rule, without providing the packet to the virtual machine for routing. The method may also include, responsive to determining that a first status of the processing of the packet by the packet processing module indicates that the packet is ready for transmission to the destination node, transmitting the packet to the destination node.

20 Claims, 5 Drawing Sheets

(56) References Cited

U.S. PATENT DOCUMENTS

| | | | |
|---|---|---|---|
| 2006/0282660 | A1 | 12/2006 | Varghese et al. |
| 2014/0269379 | A1 | 9/2014 | Holbrook et al. |
| 2014/0317677 | A1 | 10/2014 | Vaidya et al. |
| 2015/0207662 | A1 | 7/2015 | Basso et al. |
| 2016/0080414 | A1 | 3/2016 | Kolton et al. |
| 2016/0277447 | A1 | 9/2016 | Pope et al. |
| 2016/0299777 | A1* | 10/2016 | Tsirkin ................ G06F 9/45533 |
| 2016/0380865 | A1 | 12/2016 | Dubal et al. |
| 2017/0093677 | A1 | 3/2017 | Skerry et al. |
| 2017/0104679 | A1* | 4/2017 | Sunavala ............ G06F 9/45558 |
| 2017/0155724 | A1 | 6/2017 | Haddad et al. |
| 2017/0171159 | A1 | 6/2017 | Kumar et al. |
| 2017/0177396 | A1 | 6/2017 | Palermo et al. |
| 2017/0289068 | A1* | 10/2017 | Palermo .............. H04L 49/9047 |
| 2018/0254981 | A1* | 9/2018 | Babu ........................ H04L 45/26 |
| 2019/0044812 | A1 | 2/2019 | Loftus et al. |
| 2019/0050273 | A1 | 2/2019 | Tamir et al. |
| 2019/0068491 | A1 | 2/2019 | Tsirkin |

OTHER PUBLICATIONS

Unknown. "2017 NFV Report Series Part I: Foundations of NFV: NFV Infrastructure and VIM". 2017. http://events.windriver.com/wrcd01/wrcm/2017/06/report-foundation-of-nfv-infrastructure-and-vim-2.pdf. Retrieved on Jun. 28, 2017. 55 pages.

Dredge, Simon. Dec. 31, 2015. "Accelerating the NFV Data Plane: SR-IOV and DPDK . . . in my own Words". www.metaswitch.com/the-switch/accelerating-the-nfv-data-plane. Retrieved on Jun. 28, 2017.15 pages.

Unknown. "Software Defined Networking SDN100". 2017. https://training.mirantis.com/wp-content/uploads/2017/06/Mirantis-SDN100.pdf. Retrieved on Jun. 28, 2017. 2 pages.

Cartee et al. Apr. 3-6, 2017. "Open Networking Summit 2017". https://ons2017.sched.com/event/9ktv/io-visor-programmable-in-kernel-data-plane-with-ebpf-and-xdp-wendy-cartee-deepa-kalani-io-visor-project. Retrieved on Jun. 27, 2017. 3 pages.

Kourai K., Azumi, T., & Chiba, S. (Apr. 1, 2014). Efficient and Fine-grained VMM-level Packet Filtering for Self-protection. International Journal of Adaptive, Resilient and Autonomic Systems (IJARAS), 5(2), 83-100. 18 pages.

Fitzmacken, Neira, Squillace, Diogenes (Jan. 9, 2017) Getting started with Microsoft Azure security. Retrieved May 26, 2017 from https://docs.microsoft.com/enus/azure/security/azuresecuritygettingstarted. 11 pages.

Kicinski, Jakub and Viljoen, Nicolaas, Netronome Systems Cambridge, United Kingdom, "eBPF Hardware Offload to SmartNICs: CLS BPF and XDP", https://open-nfp.org/documents/1/eBPF_HW_OFFLOAD_HNiMne8.pdf, Nov. 10, 2016, 6 pages.

Hoiland-Jorgensen, Toke et al., Karlstad University; Red Hat; Cilium.io; Quantonium Inc.; Cumulus Networks, "The Express Data Path: Fast Programmable Packet Processing in the Operating System Kernel", https://dl.acm.org/citation.cfm?id=3281443, Dec. 4-7, 2018, 13 pages.

Scholz, Dominik, et al., Chair of Network Architectures and Services, Department of Informatics, Technical University of Munich, "Performance Implications of Packet Filtering with Linux eBPF", https://www.net.in.tum.de/fileadmin/bibtex/publications/papers/ITC30-Packet-Filtering-eBPF-XDP.pdf, Oct. 21, 2018, 9 pages.

Kicinski, Jakub, Netronome Systems Santa Clara, United States, "XDP Hardware Offload: Current Work, Debugging and Edge Cases", https://www.netronome.com/media/documents/viljoen-xdpoffload-talk_2.pdf, 5 pgaes.

* cited by examiner

HYPERVISOR SUPPORT FOR NETWORK FUNCTIONS VIRTUALIZATION

TECHNICAL FIELD

The present disclosure is generally related to virtualization, and is more specifically related to hypervisor support for network functions virtualization.

BACKGROUND

Data centers may include clusters consisting of multiple hosts (e.g., physical servers) in racks. Hypervisors may operate on each host to create and run virtual machines (VMs). VMs emulate computer systems and may be referred to as guest machines. The hosts in the clusters may be connected via one or more wired (e.g., Ethernet) and/or wireless (e.g., WiFi) networks (e.g., the Internet, local area network). Network functions virtualization (NFV) may refer to using a virtualized environment to virtualize network services that are otherwise provided by dedicated hardware devices. For example, NFV may decouple network functions carried out by routers, bridges, firewalls, load balancers, and other dedicated hardware devices to be hosted on virtual machines.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
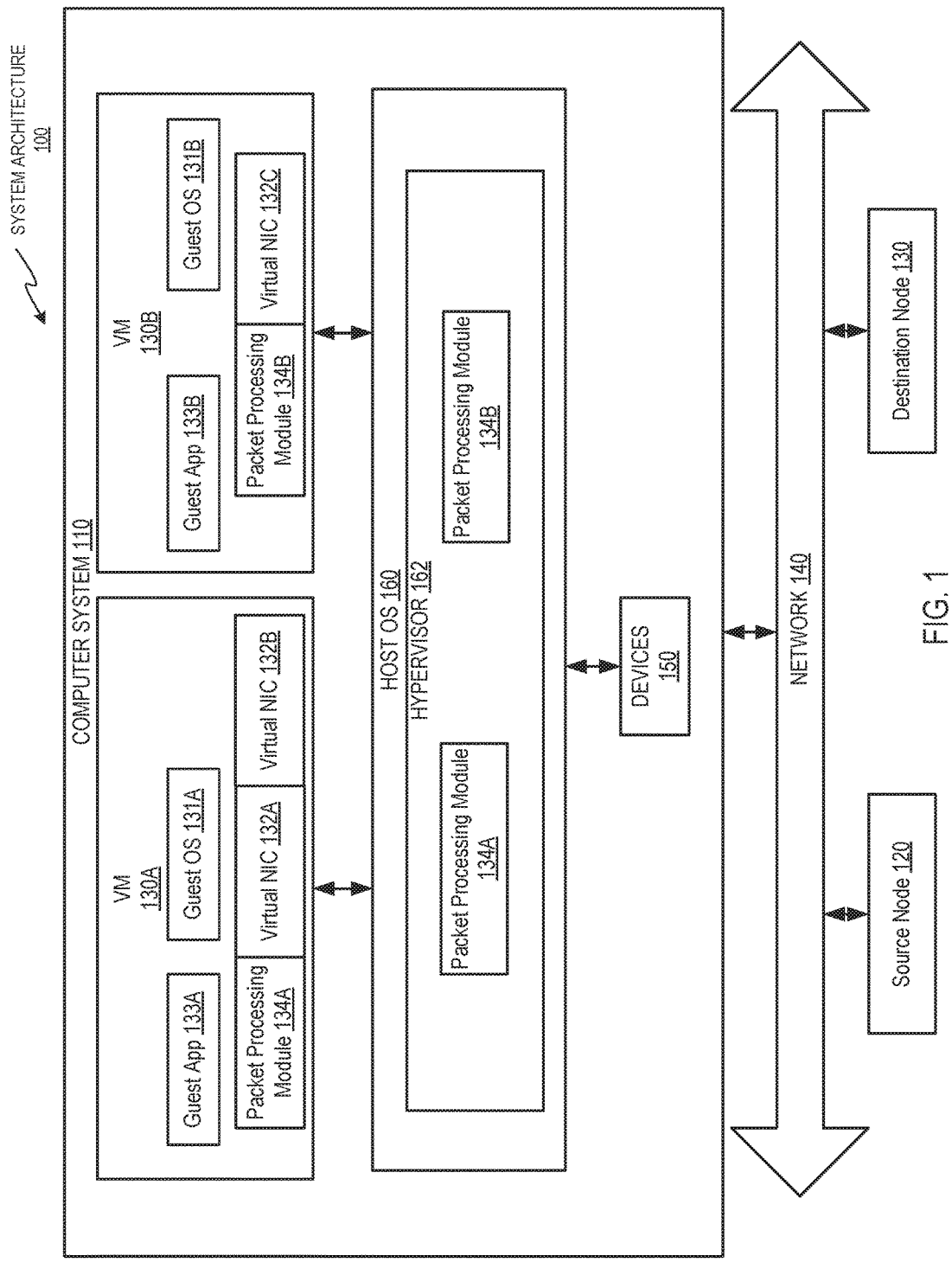
FIG. 1 depicts a high-level diagram of an example system architecture operating in accordance with one or more aspects of the present disclosure.

A network functions virtualization (NFV) bridging solution may involve a virtual machine operating as a bridge or a router. For example, the virtual machine may receive, from a source node, a packet that is intended to be transmitted to a destination node. A packet may be intended to be transmitted to a destination node if the packet is determined to be associated with an address of the destination node. For example, a forwarding table may be used to lookup the destination node address to which the packet should be forwarded. The destination node may be determined to be separate from the virtual machine operating as the bridge or router. The virtual machine may receive the packet on a virtual network interface card (NIC) from a hypervisor. The virtual machine may modify the headers in the packet (e.g., adding or removing encapsulation) and forward the packet back out of the virtual NIC to the hypervisor for transmission to the destination node. However, running the virtual machine in this scheme entails forwarding packets back and forth with the hypervisor. Such forwarding may include at least one virtual machine exit per packet (or batch of packets). The virtual machine exits may result in latency, consumption of power, and/or consumption of central processing unit (CPU) cycles.

Aspects of the present disclosure address the above and other deficiencies by providing technology directed to hypervisor supported NFV. In an example, the hypervisor may be executing on a host system and may receive, from a source node, a packet that is intended to be transmitted to a destination node via a virtual machine running on the hypervisor. The hypervisor may execute a packet processing module to process the packet and perform one or more network functions discussed in more detail below. The packet processing module may be created by the virtual machine in view of one or more rules (e.g., modify the packet such that the packet can be transmitted to a particular destination node, specify a particular physical or virtual NIC to use for transmission, specify a specific network to use for transmission, pass the packet to the virtual machine, drop the packet, etc.) for processing packets. The virtual machine may provide the packet processing module to the hypervisor via a virtual NIC at setup time of the virtual machine or at a subsequent time while the virtual machine is operating. In one example, the packet processing module may be an express data path (XDP) module.

One network function performed may include processing the packet for transmission to a destination node in view of one of the rules, without sending the packet to the virtual machine. Processing the packet may include modifying the packet by adding encapsulation headers, removing encapsulation headers (de-encapsulating), encrypting data within the packet, decrypting data within the packet, and the like. The packet processing module may return a status of the processing of the packet to the hypervisor indicating that the packet is ready for transmission to the destination node. A packet may be considered ready for transmission to a destination node if the packet is modified (e.g., encapsulated/de-encapsulated) during processing and it is determined that the packet is to be transmitted to the destination node. In an example, the packet processing module may also return an identifier of the destination node (e.g., an identifier of a second host system, a second hypervisor, a second virtual machine, etc.), an identifier of a NIC (e.g., virtual, physical, etc.), and/or an identifier of a specific network (e.g., a virtual local area network (vLAN), a local area network (LAN), a wide area network (WAN), etc.).

When the packet processing module returns the identifier of the destination node, the hypervisor may transmit the packet to that destination node. In one example, depending on the particular identifier (e.g., virtual NIC, physical NIC, specific network, etc.) returned by the packet processing module, the hypervisor may determine the destination node to which to transmit the packet and/or how to transmit the packet (e.g., which physical NIC or virtual NIC to use and/or which network to use). For example, when the packet processing module returns an identifier of a virtual NIC, the hypervisor may use a lookup table to determine a destination node (e.g., second virtual machine, second hypervisor, second host, etc.)) associated with (e.g., connected to) the virtual NIC. The hypervisor may transmit the packet to the destination node associated with the virtual NIC. In another example, when the packet processing module returns an identifier of the specific network to use for transmitting the packet, the hypervisor may determine the NIC (e.g., virtual or physical) associated with the specific network and may transmit the packet over the specific network to the destination node using the NIC.

Another network function may include passing the packet to the virtual machine in view of one of the rules. For example, the packet may be addressed to a destination node unrecognized by the packet processing module and the packet processing module may not modify the headers of the packet. The packet processing module may return a status of the processing of the packet to the hypervisor indicating that the packet is ready for transmission to the virtual machine. A packet may be considered ready for transmission to a virtual machine if the packet is not modified (e.g., not encapsulated/de-encapsulated) during processing and it is determined that the packet is to be transmitted to the virtual machine. As a result, the hypervisor may transmit the packet to the virtual machine such that the packet processing module may be updated to include a rule associated with the unrecognized destination node. Upon receipt, the virtual machine may not re-execute the packet processing module that it previously sent to the hypervisor, but instead, the virtual machine may handle the packet according to a packet protocol. The virtual machine may update the packet processing module with a rule associated with the new destination node and provide the updated packet processing module to the hypervisor.

Another network function may include dropping the packet in view of one of the rules. For example, the packet processing module may process the packet and return a status of the processing of the packet to the hypervisor indicating that the packet is to be dropped. As a result, the hypervisor may drop the packet.

The techniques disclosed herein may provide a hypervisor supported NFV bridging solution where the hypervisor executes the packet processing module to process the packets for transmission and transmits the packets to a destination node without entering or exiting the virtual machine. In such an instance, the virtual machine may not be interrupted (e.g., remain asleep), thereby increasing efficiency of a computer system by reducing power consumption and CPU cycles.

FIG. 1 illustrates an example system architecture 100 in which implementations of the disclosure may operate. The system architecture 100 may include a computer system 110, a source node 120, and a destination node 130 coupled via a network 140. In one example, the computer system 110, the source node 120, and the destination node 130 may be host systems in a cluster in a data center. In another example, the computer system 110 may be a host system and the source node 120 and the destination node 130 may be virtual machines, hypervisors, and/or devices (e.g., virtual and/or physical NICs) running on the computer system 110 or another computer system. The network 140 may be a public network (e.g., the Internet), a private network (e.g., a virtual local area network (vLAN), a local area network (LAN), or a wide area network (WAN)), or a combination thereof. The network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, the network 140 may include a wired infrastructure (e.g., Ethernet).

The computer system 110 may comprise one or more processing devices communicatively coupled to memory devices and devices 150 (e.g., I/O devices, CD-ROM drive, physical NICs, etc.). The computer system 110 may be a server, a mainframe, a workstation, a personal computer (PC), a laptop, a mobile phone, a palm-sized computing device, or any suitable computing device. The computer system 110 runs a host operating system (OS) 160, which is an application that manages the hardware resources of the computer system 110 and that provides functions such as interprocess communication, scheduling, memory management, and so forth. In an example, the host OS 160 may include and execute a hypervisor 162. The hypervisor 162 may be an application that provides a virtual operating platform for a set of virtual machines 130A and 130B. Although two virtual machines 130A and 130B are depicted, it should be understood that fewer (e.g., 1) or more (e.g., 3, 4, 5, 6, etc.) virtual machines may be included in the computer system 110. The hypervisor 162 abstracts the physical layer of the computer system 110, including the processors, memory, I/O devices, network devices, and presents this abstraction to the virtual machines 130A and 130B. The hypervisor 162 may create, run, manage, and monitor various aspects of virtual machines operation, including the processing, and storage, memory, and network interfaces.

The virtual machines 130A and 130B may be implemented in computer instructions that emulate physical machines and may execute applications as though they were actual physical machines. For example, each virtual machine 130A and 130B executes a guest operating system 131A and 131B, respectively, that may utilize the underlying virtual devices, including virtual processors, virtual memory, virtual I/O devices, and virtual NICs 132A, 132B, and 132C. Although FIG. 1 depicts the virtual machine 130A as including two virtual NICs 132A and 132B and the virtual machine 130B as including one virtual NIC 132C, it should be understood that there may be multiple virtual NICs included in either or both of the virtual machines 130A and 130B. Further the virtual NICs in the virtual machines 130A and/or 130B may perform the same or different operations within their respective virtual machines. For example, in the virtual machine 130A, the virtual NIC 132A may be used to receive packets and the virtual NIC 132B may be used to transmit packets.

One or more guest applications 133A and 133B may be running on the virtual machines 130A and 130B under the guest operating systems 131A and 131B. The one or more guest applications 133A and 133B may be high-level applications (e.g., user facing applications) or low-level applications (e.g., operating system level applications). In one example, the guest application 133A and 133B may each create a packet processing module 134A and 134B using one or more rules for processing packets. In another example, the packet processing modules 134A and 134B may be created by the guest OSes 131A and 131B. In yet another example, the packet processing modules 134A and 134B may be created by a user and provided to the virtual machines 130A and 130B. The packet processing modules 134A and 134B may each be an express data path (XDP) application. XDP provides a high performance, programmable network data path in the kernel. XDP provides bare metal packet processing at the lowest point in an application stack.

The guest applications 133A and 133B may send the packet processing modules 134A and 134B to the guest OSes 131A and 131B for validation. Validating the packet processing modules 134A and 134B may include verifying that the packet processing modules 134A and 134B can be granted a high privilege level of operation by not executing illegal instructions (e.g., changing arbitrary memory outside the packet buffer, executing back branches, running certain loops, sending data outside of packets, etc.). Validating the packet processing modules 134A and 134B via the guest OSes 131A and 131B ensures that the packet processing modules 134A and 134B may be run properly at the hypervisor 162. In some instances, the packet processing modules 134A and 134B may not be validated by the guest OSes 131A and 131B.

In one example, the guest OSes 131A and 131B may attach the packet processing modules 134A and 134B to the virtual NIC 132A and 132C to be provided to the hypervisor 162. In another example, the guest applications 133A and 133B may attach the packet processing modules 134A and 134B to the virtual NIC 132A and 132C to be provided to the hypervisor 162. In one example, the providing of the packet processing modules 134A and 134B may occur once during setup of the virtual machines 130A and 130B. In another example, an updated packet processing module 134A and 134B may be provided at a time subsequent to setup.

As depicted, the hypervisor 162 may receive the packet processing modules 134A and 134B. For example, the hypervisor 162 may receive instructions (e.g., Berkeley Packet Filter bytecode) that implement the packet processing modules 134A and 134B. The hypervisor may validate the instructions of the packet processing modules 134A and 134B. In instances where the packet processing modules 134A and 134B were validated by the guest OSes 131A and 131B, the hypervisor 162 may repeat the validation to ensure that the same illegal operations are not being performed by the packet processing modules 134A and 134B. In instances where the guest OSes 131A and 131B did not validate the packet processing modules 134A and 134B, the hypervisor 162 may validate that the illegal operations are not being performed by the packet processing modules 134A and 134B for the first time. If the instructions of the packet processing modules 134A and 134B are valid, the hypervisor 162 may store the packet processing modules 134A and 134B (e.g., executables) in memory associated with the hypervisor 162.

When packets are received by the hypervisor 162, the hypervisor 162 may determine the virtual machine 130A or 130B through which the packets are intended to be routed and select the packet processing module 134A or 134B accordingly. For example, if a packet is intended to be sent to the destination node 130 through the virtual machine 130A, the hypervisor 162 may identify the packet processing module 134A in the memory and cause execution of the packet processing module 134A to process the packet.

In one example, the packet processing module 134A may process received packets in view of one or more rules. For example, a first rule of the rules may cause the packet processing module 134A to process (e.g., modifying encapsulation headers, adding encapsulation headers, removing encapsulation headers, encrypting data in the packet, decrypting data in the packet, etc.) the packet for transmission to the destination node 130, without providing the packet to the virtual machine 130A for routing. In instances where the encapsulation headers are modified, a destination address for the packet may be changed.

The first rule may cause the packet processing modules 134A to return a destination address to which to transmit the packet, an identifier of a NIC (e.g., virtual or physical) to use to transmit the packet, an identifier of a network to use to transmit the packet, and the like. For example, the first rule may cause the packet processing module 134A to process a packet to identify a source address from which the packet was sent and to specify the destination address of the destination node 130 to which the packet is to be routed in the encapsulation header. In an example, when an identifier of a virtual NIC is returned, the hypervisor 162 may use a lookup table to identify the destination node 130 (e.g., virtual machine 130B, another hypervisor, another host, etc.) associated with the identifier of the virtual NIC. The lookup table may provide an address of the destination node 130 that is connected to the virtual NIC.

In instances where the first rule causes modification of the packet for transmission to the destination node 130, the packet processing module may return a status indicating that the packet is ready for transmission to the destination node 130 when the packet is processed. In response to determining that the status of the processing of the packet by the packet processing module 145A indicates that the packet is ready for transmission to the destination node 130, the hypervisor 162 may transmit the packet to the destination node 130. In an example, the hypervisor 162 may handle the packet as if the virtual machine 130A transmitted the packet out of the virtual NIC 132B. The hypervisor 162 may identify the destination address of the destination node 130 in the processed packet or the hypervisor 162 may use the destination address provided by the packet processing module 134A or the destination address determined via the lookup table.

A second rule may cause the packet processing module 134A to process the packet by inspecting the packet and determining not to modify the headers (e.g., refrain from encapsulating or de-encapsulating the headers). For example, when a destination node is specified in the packet that the packet processing module 134A does not recognize, the packet processing module 134A may determine that the packet is to be passed to the virtual machine 130A so the virtual machine 130A may update the packet processing module 134A with the new destination node. The packet processing module 134A may return a status of the processing of the packet that indicates that the packet is ready for transmission to the virtual machine 130A. The hypervisor 162 may receive the status and transmit the packet to the virtual machine 130A via the virtual NIC 132A. In an example, the virtual machine 130A may detect that the packet processing module 134A already processed the packet on the hypervisor 162 and may not re-execute the packet processing module 134A. Instead, the virtual machine 130A may handle the packet according to a protocol. Further, the guest application 133A may update the packet processing module 134A with a rule pertaining to the new destination node and the updated packet processing module 134A may be provided to the hypervisor 162.

A third rule may cause the packet processing module 134A to process the packet by inspecting the packet and determining that the packet is to be dropped. For example, various filtering techniques may identify that a packet includes malicious data or unrecognized patterns of data. As such, the packet processing module 134A may return a status of the processing of the packet that indicates that the packet is to be dropped. In response to receiving the status, the hypervisor 162 may drop the packet.

Figure 2:
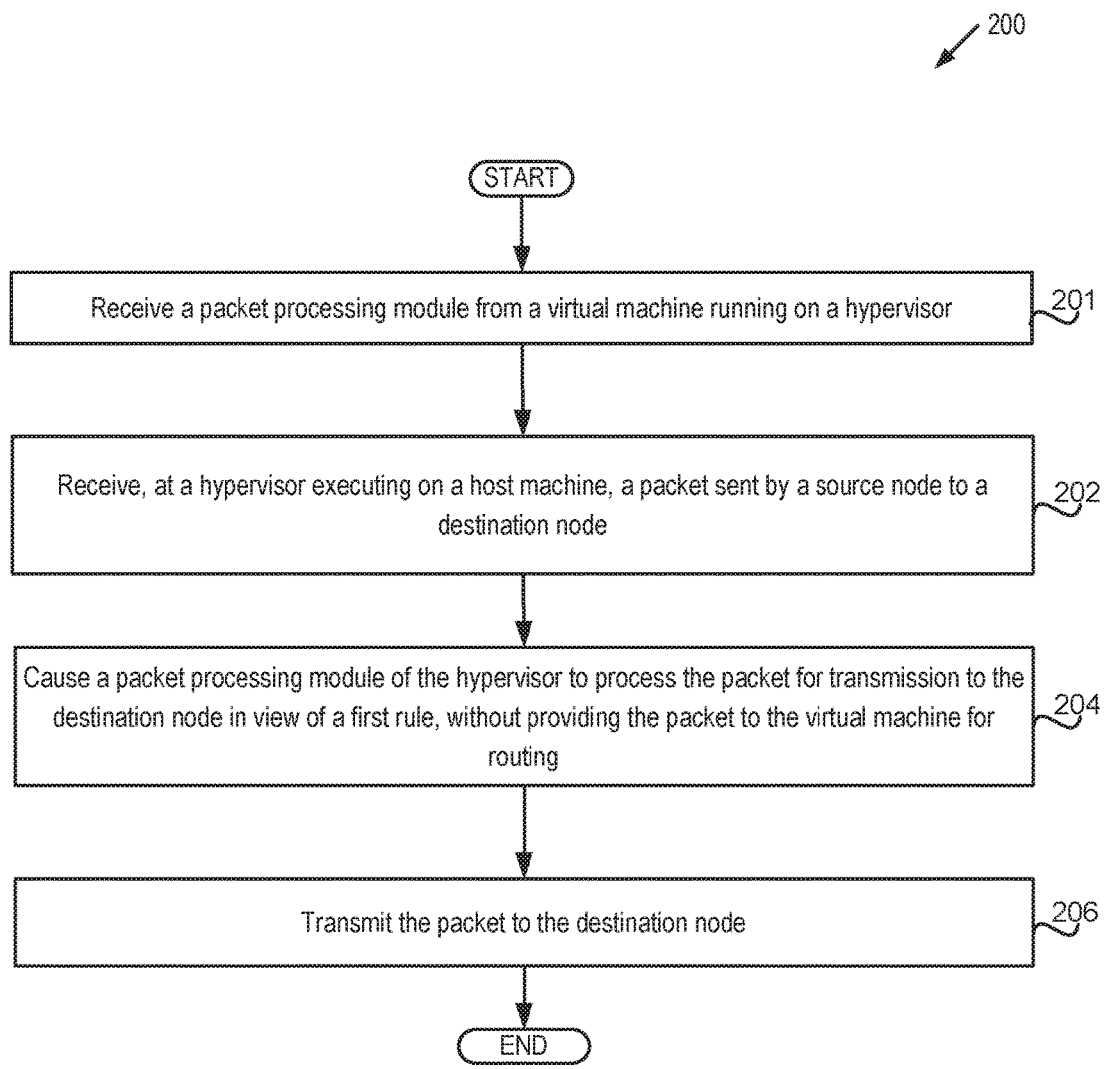
FIG. 2 depicts a flow diagram of an example method for a hypervisor supporting network functions virtualization, in accordance with one or more aspects of the present disclosure.

FIG. 2 depicts a flow diagram of an example method 200 for a hypervisor 162 supporting network functions virtualization (NFV), in accordance with one or more aspects of the present disclosure. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by the hypervisor 162 executed by one or more processing devices of the computer system 110.

Method 200 may begin at block 201. At block 201, a processing device may receive a packet processing module 134A and/or 134B. As described above, the packet processing module 134A may be received by the hypervisor 162 from the guest application 133A or the guest OS 131A via the virtual NIC 132A of the virtual machine 130A, and/or the packet processing module 134B may be received by the hypervisor 162 from the guest application 133B or the guest OS 131B via the virtual NIC 132C of the virtual machine 130B. The hypervisor 162 may validate that the packet processing modules 134A and/or 134B are secure and do not cause any illegal instructions to be executed.

At block 202, a processing device may receive, at a hypervisor 162 executing on the host machine (computer system 110), a packet sent by a source node 120 to a destination node 130. The packet may be intended to be routed via the virtual machine 130A running on the hypervisor 162 to reach the destination node 130. In one example, the destination node 130 may be determined to be separate from the virtual machine 130A. The processing device may identify, based on the virtual machine 130A or 130B to which the packet is intended to be routed, the packet processing module 134A or 134B in a memory associated with the hypervisor 162. For ease of discussion, the packet processing module 134A is selected by the processing device in the below description of method 200. However, it should be understood that the packet processing module 134B may function similarly as packet processing module 134A.

At block 204, the processing device may cause the packet processing module 134A of the hypervisor 162 to process the packet for transmission to the destination node 130 in view of a first rule, without providing the packet to the virtual machine 130A for routing. The first rule may cause the packet processing module 134A to modify the packet (e.g., add encapsulation, remove encapsulation, encrypt data, decrypt data, etc.). Further, the first rule may cause the packet processing module 134A to return an identifier of the destination node 130, an identifier of a virtual NIC, an identifier of a specific network, and so forth. Once processed in view of the first rule, the packet processing module 134A may return a status of the processing of the packet that indicates that the packet is ready for transmission to the destination node 130.

In an example, the processing device may receive, from the packet processing module 134A, an identifier of a virtual NIC (e.g., virtual NIC 132B) that would be used by the virtual machine 130A to transmit the packet. The virtual NIC (e.g., virtual NIC 132B) that would be used to transmit the packet may be different than the virtual NIC (e.g., virtual NIC 132A) from which the packet processing module 134A was received. The processing device may determine a second virtual machine (e.g., virtual machine 130B), or any suitable destination node 130, associated with the identifier of the virtual NIC 132B. For example, the processing device may use a lookup table to find the second virtual machine, or other destination node 130, that is associated with the identifier of the virtual NIC 132B. The second virtual machine 130B or other destination node 130 may be connected to the virtual NIC 132B (e.g., via virtual NIC 132C). The lookup table may provide the virtual address of the second virtual machine or other destination node 130. Also, the second virtual machine may correspond to the destination node 130.

In another example, the processing device may receive, from the packet processing module 134A, an identifier of a specific network (e.g., VLAN, LAN, WAN, etc.) to use for transmitting the packet. The processing device may determine a NIC (e.g., virtual or physical) associated with the identifier of the specific network to use for transmitting the packet. In an example, the processing device may use a lookup table to identify the NIC associated with the identifier of the specific network.

In yet another example, the processing device may receive, from the packet processing module 134A, an identifier of the destination node 130. The destination node 130 may include a second host, a second hypervisor, a second virtual machine, or the like. The identifier may include a name, address, or the like.

At block 206, the processing device may, responsive to determining that a first status of the processing of the packet by the packet processing module 130A indicates that the packet is ready for transmission to the destination node 130, transmit the packet to the destination node 130A. In the example where the identifier of the virtual NIC 132B was received from the packet processing module 134A, the processing device may transmit the packet to the destination node 130 associated with the virtual NIC 132B. In the example where the identifier of the specific network was received from the packet processing module 134A, the processing device may transmit the packet over the specific network to the destination node using the identified NIC. It should be understood, that the packet may be transmitted to the destination node 130 without interrupting the virtual machine 130A through which the packet was initially intended to be routed. That is the packet may be transmitted while the virtual machine 130A remains in a sleep mode or a hibernation mode of operation. Bypassing the virtual machine 130A may save CPU cycles and/or power and increase efficiency.

In another example, the processing device may cause the packet processing module 134A of the hypervisor 162 to process the packet for transmission to the virtual machine 130A, instead of the destination node 130, in view of a second rule. For example, the destination node 130 may not be recognized by the packet processing module 134A, in which case the packet is determined to be sent to the virtual machine 130A such that the packet processing module 134A may be updated by the virtual machine 130A (e.g., guest application 133A) to include a rule for the unrecognized destination node 130. The processing device may cause the virtual machine 130A to change an operation mode to an awake mode. Further, the processing device may, responsive to determining that a second status of the processing of the packet by the packet processing module 134A indicates that the packet is ready for transmission to the virtual machine 130A, transmit the packet to the virtual machine 130A.

In another example, the processing device may cause the packet processing module 134A of the hypervisor 162 to determine that the packet is to be dropped in view of a third rule. For example, the third rule may include filtering logic that determines the data in the packet includes an unexpected pattern. The processing device may, responsive to determining that a second status of the processing of the packet by the packet processing module 134A indicates that the packet is to be dropped, drop the packet.

Figure 3:
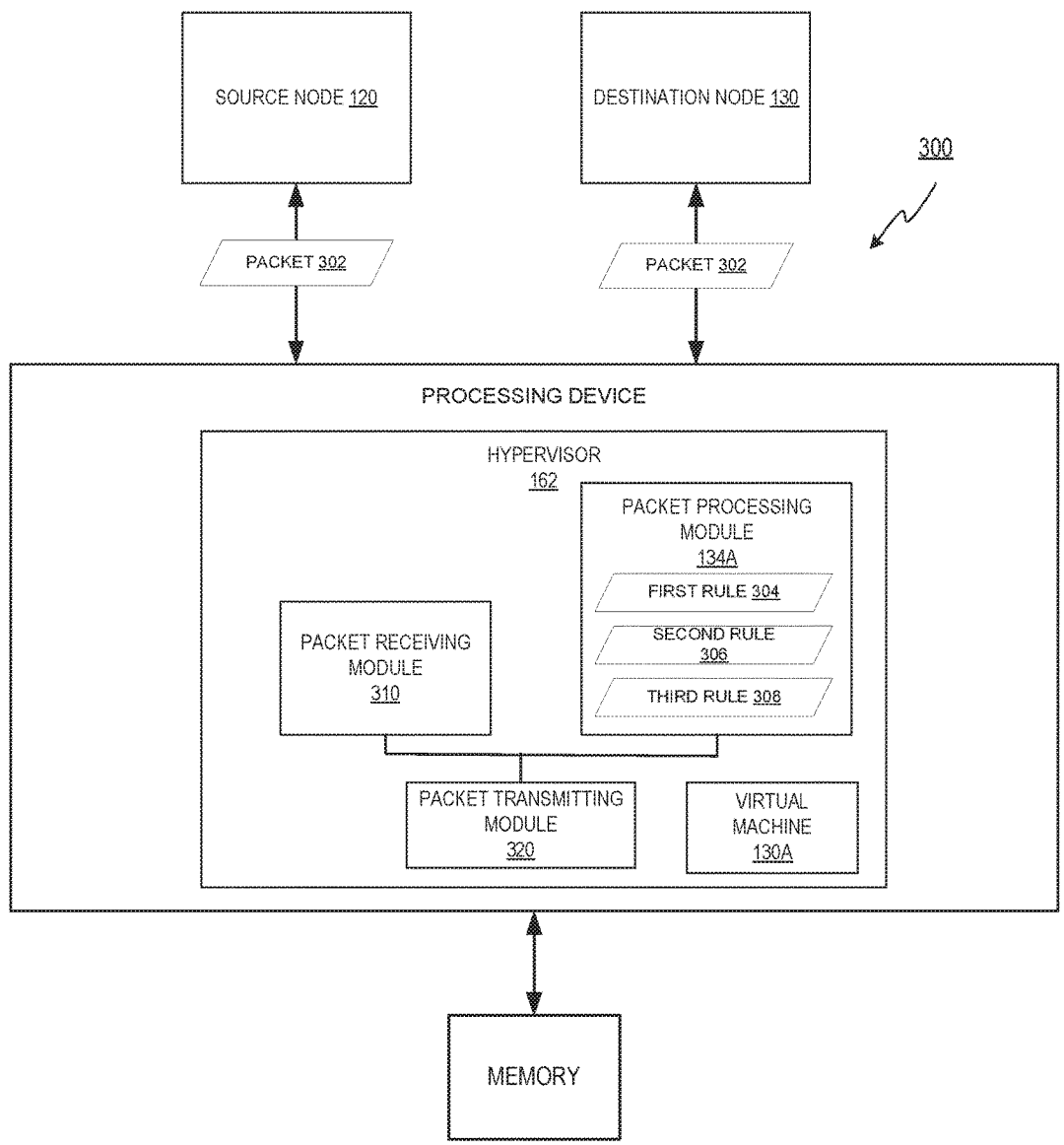
FIG. 3 depicts a block diagram of an example computer system, in accordance with one or more aspects of the present disclosure.

FIG. 3 depicts a block diagram of an example computer system 300, in accordance with one or more aspects of the present disclosure. Computer system 300 may be the same or similar to the computer system 110 and may include one or more processing devices and one or more memory devices. In the example shown, the processing device of the computer system 300 may include the hypervisor 162. The hypervisor may include packet receiving module 310, packet processing module 134A, and packet transmitting module 320. Although packet processing module 134A is depicted, it should be noted that any other suitable packet processing module (e.g., packet processing module 134B) may be included in the hypervisor 162. Also, as depicted, computer system 300 may be communicatively coupled to the source node 110 and the destination node 130. The hypervisor 162 may execute each of the packet receiving module 310, the packet processing module 134A, and the packet transmitting module 320.

The packet receiving module 310 may receive a packet 302 sent by a source node 120 to a destination node 130. The packet 302 may be intended to be routed via a virtual machine 130A running on the hypervisor 162 to reach the destination node 130.

The packet processing module 134A may process the packet 302 for transmission to the destination node 130 in view of a first rule 304, without providing the packet to the virtual machine 130A for routing. The hypervisor 162 may identify, based on the virtual machine 130A to which the packet 302 is intended to be routed, the packet processing module 134A in the memory. As depicted, the packet processing module 134A is selected, but if the packet 302 is intended to be routed through virtual machine 130B, then packet processing module 134B may be selected. Also, prior to receiving the packet 302, the packet processing modules 134A may be received by the hypervisor 162 from the guest application 133A or the guest OS 131A via the virtual NIC 132A of the virtual machine 130A. The hypervisor 162 may validate that the packet processing module 134A is secure and does not cause any illegal instructions to be executed.

The first rule 304 may cause the packet processing module 134A to modify the packet 302 (e.g., add encapsulation, remove encapsulation, encrypt data, decrypt data, etc.). Further, the first rule 304 may cause the packet processing module 134A to return an identifier of the destination node 130, an identifier of a virtual NIC, an identifier of a specific network, and so forth. Once processed in view of the first rule 304, the packet processing module 134A may return a status of the processing of the packet 302 that indicates that the packet 302 is ready for transmission to the destination node 130.

The packet transmitting module 320 may, responsive to determining that a first status of the processing of the packet by the packet processing module 134A indicates that the packet 302 is ready for transmission to the destination node 130, transmit the packet to the destination node 130. When the packet processing module 134A returns an identifier (e.g., address) of the destination node 130, the processing device may transmit the packet 302 to the destination node 130 using the identifier. When the packet processing module 134A returns an identifier of a virtual NIC, the processing device may transmit the packet 302 to the destination node 130 (e.g., a virtual machine, hypervisor, host, etc.) associated with the virtual NIC. When the packet processing module 134A returns an identifier of a specific network to use to transmit the packet 302, the processing device may transmit the packet 302 over the specific network to the destination node 130 using a NIC identified as being associated with the specific NIC. It should be understood, that the packet may be transmitted to the destination node 130 without interrupting the virtual machine 130A through which the packet was initially intended to be routed.

In another example, the packet processing module 134A of the hypervisor 162 may process the packet 302 for transmission to the virtual machine 130A, instead of the destination node 130, in view of a second rule 306. For example, the destination node 130 may not be recognized by the packet processing module 134A, in which case the packet 302 may be determined to be sent to the virtual machine 130A such that the packet processing module 134A may be updated by the virtual machine 130A to include a rule for the unrecognized destination node 130. The packet processing module 134A may cause the virtual machine 130A to change an operation mode to an awake mode. In this example, the packet transmitting module 320 may, responsive to determining that a second status of the processing of the packet 302 by the packet processing module 134A indicates that the packet 302 is ready for transmission to the virtual machine 130A, transmit the packet 302 to the virtual machine 130A.

In another example, the packet processing module 134A may determine that the packet 302 is to be dropped in view of a third rule 308. For example, the third rule 308 may include filtering logic that determines the data in the packet 302 includes an unexpected pattern. In this example, the packet transmitting module 320 may, responsive to determining that a second status of the processing of the packet 302 by the packet processing module 134A indicates that the packet 302 is to be dropped, drop the packet 302.

Figure 4:
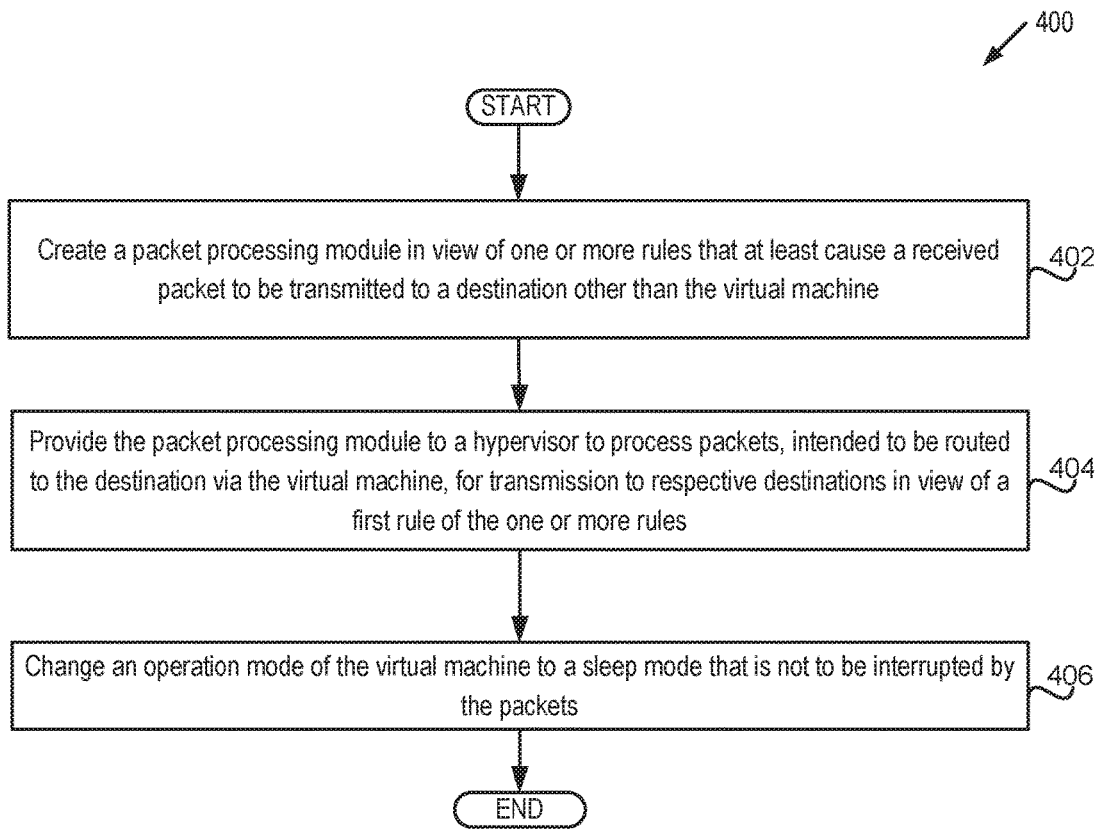
FIG. 4 depicts a flow diagram of an example method for a virtual machine enabling a hypervisor to support network functions virtualization, in accordance with one or more aspects of the present disclosure.

FIG. 4 depicts a flow diagram of an example method 400 for a virtual machine 130A enabling a hypervisor 162 to support NFV, in accordance with one or more aspects of the present disclosure. Method 400 includes operations performed by the computer system 110. Also, method 400 may be performed in the same or a similar manner as described above in regards to method 200. Method 400 may be performed by processing devices of the computer system 110 executing the virtual machine 130A. For purposes of discussion, virtual machine 130A is referenced for method 400, but it should be understood that any suitable virtual machine (e.g., virtual machine 130B) on the computer system 110 may perform the operations disclosed in method 400.

Method 400 may begin at block 402. At block 402, the processing device may create a packet processing module 134A in view of one or more rules that at least cause a received packet to be transmitted to a destination other than the virtual machine 130A. The guest application 133A executing on top of the guest OS 131A of the virtual machine 130A may create the packet processing module 134A. In an example, the guest OS 131A may validate that the instructions of the packet processing module 134A do not cause any illegal operations to be executed. The guest application 133A or the guest OS 131A may attach the packet processing module 134A to the virtual NIC 132A to be provided to the hypervisor 162.

At block 404, the processing device may provide the packet processing module 134A to a hypervisor 162 (e.g., via the virtual NIC 132A) to process packets, intended to be routed to the destination via the virtual machine 130A, for transmission to respective destinations in view of the first rule 304 of the one or more rules. The packet processing module 134A may modify the packets and return a status that causes transmission of the packets by the hypervisor 162 to the respective destinations other than the virtual machine 130A.

At block 406, the processing device may change an operation mode of the virtual machine 130A to a sleep mode that is not to be interrupted by the packets. When packets are received by the hypervisor 162 that are intended to be routed through the virtual machine 130A, the hypervisor 162 may execute the packet processing module 134A on the packets. In view of the second rule 306, the packet processing module 134A may determine that the packets are to be transmitted to the virtual machine 130A and return a status that causes transmission of the packets by the hypervisor 162 to the virtual machine 130A. In view of the third rule 308, the packet processing module 134A may determine that the packets are to be dropped and return a status that causes the hypervisor 162 to drop the packets.

Figure 5:
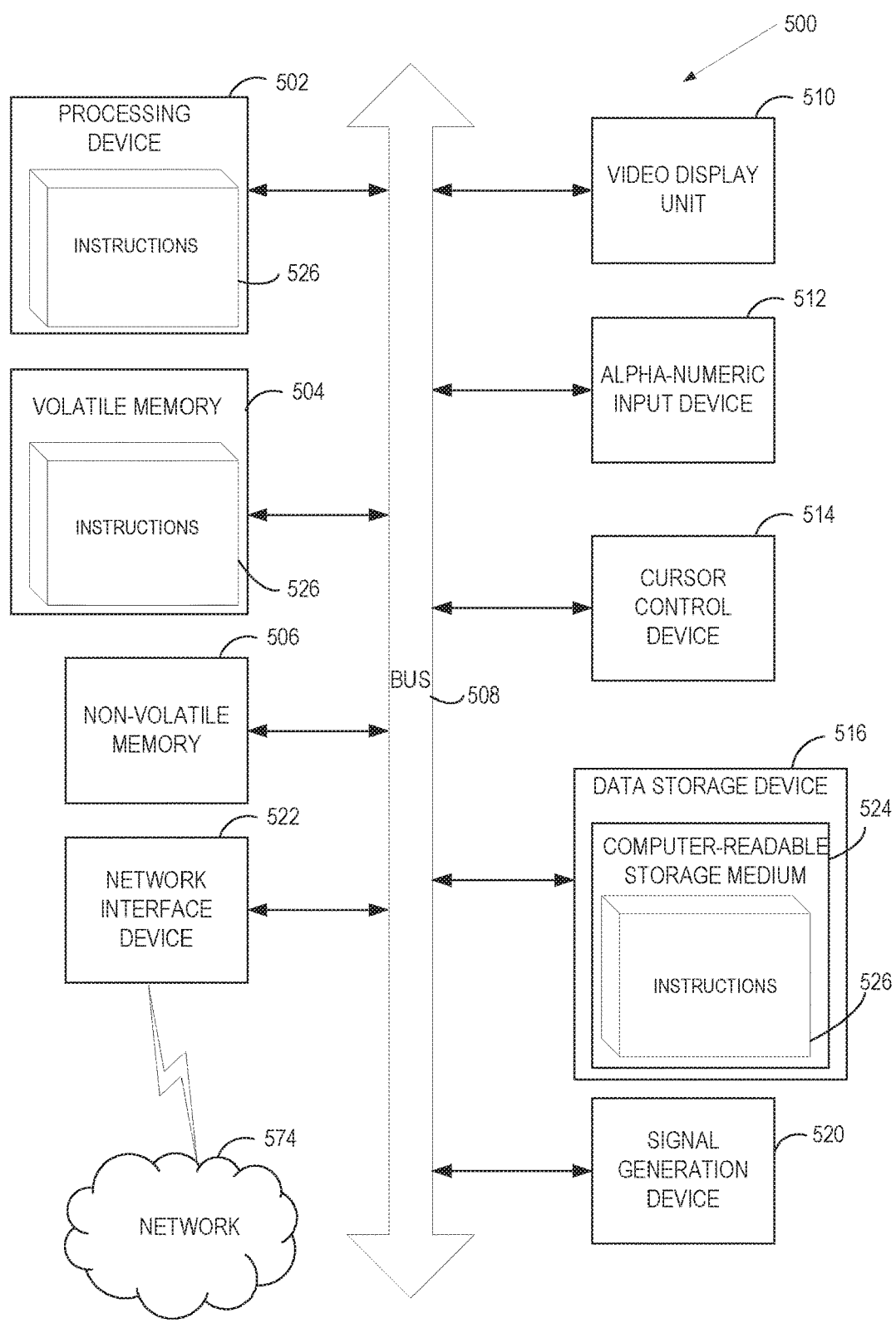
FIG. 5 depicts a block diagram of an illustrative computing device operating in accordance with the examples of the present disclosure.

FIG. 5 depicts a block diagram of a computer system operating in accordance with one or more aspects of the present disclosure. In various illustrative examples, computer system 500 may correspond to a computing device within system architecture 100 of FIG. 1. In one implementation, the computer system 500 may be the computer system 110. The computer system 500 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions implementing method 200 and method 400.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200 and 400, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
   receiving, at a hypervisor executing on a host machine, a packet sent by a source node to a destination node separate from a virtual machine running on the hypervisor, the packet intended to be routed via the virtual machine running on the hypervisor to reach the destination node;
   causing a packet processing module of the hypervisor to process the packet for transmission to the destination node in view of a first rule, without providing the packet to the virtual machine for routing; and
   responsive to determining that a first status of the processing of the packet by the packet processing module indicates that the packet is ready for transmission to the destination node, transmitting the packet to the destination node.

2. The method of claim 1, further comprising:
   receiving, from the packet processing module, an identifier of a virtual network interface card (NIC);
   determining the destination node associated with the identifier of the virtual NIC, wherein the virtual machine includes the virtual NIC and the destination node is connected to the virtual NIC; and
   responsive to determining that the first status of the processing of the packet by the packet processing module indicates that the packet is ready for transmission to the destination node, transmitting the packet to the destination node.

3. The method of claim 1, further comprising:
   receiving, from the packet processing module, an identifier of a specific network to use for transmitting the packet;
   determining a network interface card (NIC) associated with the identifier of the specific network to use for transmitting the packet; and
   responsive to determining that the first status of the processing of the packet by the packet processing module indicates that the packet is ready for transmission to the destination node, transmitting the packet over the specific network to the destination node using the NIC.

4. The method of claim 1, further comprising receiving, from the packet processing module, at least an identifier of the destination node, wherein the destination node comprises at least one of a second host, a second hypervisor, or a second virtual machine.

5. The method of claim 1, further comprising:
   causing the packet processing module of the hypervisor to process the packet for transmission to the virtual machine, instead of the destination node, in view of a second
   causing the virtual machine to change an operation mode to an awake mode; and
   responsive to determining that a second status of the processing of the packet by the packet processing module indicates that the packet is ready for transmission to the virtual machine, transmitting the packet to the virtual machine.

6. The method of claim 1, further comprising:
   causing the packet processing module of the hypervisor to determine that the packet is to be dropped in view of a second rule; and
   responsive to determining that a second status of the processing of the packet by the packet processing module indicates that the packet is to be dropped, dropping the packet.

7. The method of claim 1, further comprising, prior to causing the packet processing module of the hypervisor to process the packet for transmission, identifying, based on the virtual machine to which the packet is intended to be routed, the packet processing module in a memory associated with the hypervisor.

8. The method of claim 1, wherein causing the packet processing module of the hypervisor to process the packet for transmission to the destination node in view of the first rule comprises modifying the packet by performing at least one of adding encapsulation headers to the packet, removing encapsulation headers from the packet, encrypting data in the packet, or decrypting data in the packet.

9. The method of claim 1, wherein the packet processing module is received by the hypervisor from a guest application of the virtual machine or from a guest operating system of the virtual machine.

10. The method of claim 1, wherein the packet is transmitted to the destination node while the virtual machine remains in a sleep mode of operation.

11. The method of claim 1, further comprising validating, by the hypervisor, that the packet processing module is secure.

12. A system comprising:
a memory;
a processing device of a memory operatively coupled to the memory, the processing device to execute a hypervisor to:
receive a packet sent by a source node to a destination node, the packet intended to be routed via a virtual machine running on the hypervisor to reach the destination node;
cause a packet processing module of the hypervisor to process the packet for transmission to the destination node in view of a first rule, without providing the packet to the virtual machine for routing; and
responsive to determining that a first status of the processing of the packet by the packet processing module indicates that the packet is ready for transmission to the destination node, transmit the packet to the destination node.

13. The system of claim 12, wherein the processing device is further to execute the hypervisor to:
receive, from the packet processing module, an identifier of a virtual network interface card (NIC);
determine the destination node associated with the identifier of the virtual NIC, wherein the virtual machine includes the virtual NIC and the destination node is connected to the virtual NIC; and
responsive to determining that the first status of the processing of the packet by the packet processing module indicates that the packet is ready for transmission to the destination node, transmitting the packet to the destination node.

14. The system of claim 12, wherein the processing device is further to execute the hypervisor to:
receive, from the packet processing module, an identifier of a specific network to use for transmitting the packet;
determine a network interface card (NIC) associated with the identifier of the specific network to use for transmitting the packet; and
responsive to determining that the first status of the processing of the packet by the packet processing module indicates that the packet is ready for transmission to the destination node, transmit the packet over the specific network to the destination node using the NIC.

15. The system of claim 12, wherein the processing device is further to execute the hypervisor to receive, from the packet processing module, at least an identifier of the destination node, wherein the destination node comprises an identifier of an identifier of a second host, an identifier of a second hypervisor, or an identifier of a second virtual machine.

16. The system of claim 12, wherein the processing device is further to execute the hypervisor to:
cause the packet processing module of the hypervisor to process the packet for transmission to the virtual machine, instead of the destination node, in view of a second rule;
cause the virtual machine to change an operation mode to an awake mode; and
responsive to determining that a second status of the processing of the packet by the packet processing module indicates that the packet is ready for transmission to the virtual machine, transmitting the packet to the virtual machine.

17. The system of claim 12, wherein the processing device is further to execute the hypervisor to:
cause the packet processing module of the hypervisor to determine that the packet is to be dropped in view of a second rule; and
responsive to determining that a second status of the processing of the packet by the packet processing module indicates that the packet is to be dropped, drop the packet.

18. One or more tangible, non-transitory computer-readable media storing instructions that, when executed, cause one or more processing devices to execute a virtual machine to:
create a packet processing module in view of one or more rules that at least cause a received packet to be transmitted to a destination other than the virtual machine;
provide the packet processing module to a hypervisor to process packets, intended to be routed to the destination via the virtual machine, for transmission to respective destinations in view of a first rule of the one or more rules; and
change an operation mode of the virtual machine to a sleep mode that is not to be interrupted by the packets.

19. The computer-readable media of claim 18, wherein the packet processing module is created via a guest application executing on top of a guest operating system of the virtual machine.

20. The computer-readable media of claim 18, wherein the packet processing module returns a status that causes transmission of the packets to the respective destinations other than the virtual machine.

* * * * *